United States Patent [19]
Davis et al.

[11] Patent Number: 5,639,368
[45] Date of Patent: Jun. 17, 1997

[54] CAPILLARY MEMBRANE DEVICE

[76] Inventors: Dennis W. Davis, 10740 Eland St., Boca Raton, Fla. 33428; John L. Bill, 427 B-1 Pine Glen La., Greenacres, Fla. 33463

[21] Appl. No.: 213,984

[22] Filed: Mar. 16, 1994

[51] Int. Cl.$^6$ .................. B01D 63/00; B01D 15/04
[52] U.S. Cl. .................. 210/321.8; 210/321.79; 210/321.78; 210/321.88; 210/500.23; 210/638; 210/175; 204/210; 204/409; 204/241; 264/DIG. 48
[58] Field of Search .................. 210/321.78, 321.79, 210/321.8, 321.87, 321.88, 321.89, 500.23, 500.21, 356, 398, 433.1, 638, 175; 204/298.31, 295, 296, 409, 241, 210, DIG. 48

[56] References Cited

U.S. PATENT DOCUMENTS

| | | | |
|---|---|---|---|
| 4,105,731 | 8/1978 | Yamazaki | 210/500.23 |
| 4,231,871 | 11/1980 | Lipps et al. | 210/500.23 |
| 4,247,393 | 1/1981 | Wallace | 210/500.23 |
| 4,310,399 | 1/1982 | Columbus | 204/409 |
| 4,381,985 | 5/1983 | Ryder, Jr. | 204/296 |
| 4,666,543 | 5/1987 | Kawano | 210/500.23 |
| 5,139,668 | 8/1992 | Pan et al. | 210/500.23 |

*Primary Examiner*—Ana Fortuna

[57] ABSTRACT

A channelized mass transfer membrane (MTM) is disclosed which has improved ion separation characteristics when employed in electrodialysis cells. The MTM exploits the unexpected ion separation ability of channelized membrane geometries. A major improvement of the disclosed invention is the use of tubular channels formed by means of hollow fibers which limit the directions in which ions can diffuse. The chief embodiments of the MTM exploit either the formation of capillary voids in solid material or the use of hollow fibers to form capillary channels. Additional levels of MTM porosity are achieved by filling of the channels with microporous material. Means are disclosed for cooling the MTM and adaptation of the MTM hydraulic resistance.

16 Claims, 10 Drawing Sheets

CAPILLARY MEMBRANE DEVICE

BACKGROUND-FIELD OF THE INVENTION

This invention relates to the use of capillary paths of appropriate diameter to form a channelized mass transfer membrane (MTM) useful in chemical and electrochemical applications. The capillary paths are formed by creation of voids in a solid material or by use of hollow fibers.

BACKGROUND-DESCRIPTION OF THE PRIOR ART

Hollow fiber membranes

These membranes were first developed by Mahon and the group at Dow Chemical in 1960. Such membranes were subsequently commercialized by Dow Chemical, DuPont, Monsanto, and others. Polymeric hollow fibers are typically made having diameters in the range 25 to 200 microns.

There are two main types of hollow fiber membranes, homogeneous and microporous. Homogeneous hollow fibers have solid, thin walls of relatively uniform density. Membranes constructed from such fibers are used for gas separations by exploiting selective diffusion of gas molecules through the thin fiber wall.

Conventional homogeneous hollow fiber membranes exploit the transport of chemical species across the wall of the fiber, whereas embodiments of the presently disclosed invention which use homogeneous hollow fibers, allow the transport of chemical species solely along the axis of the fiber. In conventional fiber membranes, the filtering process takes place across the "solid" fiber wall. That is, for certain chemical species (especially in gaseous form) the microscopic porosity of the "solid" fiber wall is sufficient to allow migration of species through the wall. In the present invention, filtering is achieved by the ion selective channels formed by the length of the fibers themselves. Ionic species are introduced at the open fiber ends and caused to electromigrate along the length of the fibers by the influence of an external electric field applied parallel to the longitudinal axis of the fibers. In certain versions of the presently disclosed invention, these fibers are potted in a solid, impermeable material.

The second category of hollow fiber membranes uses fibers having microporous walls. The disctinction with the previous category of fiber membranes is a matter of degree in that the fibers used in these membranes are designed to have voids in the fiber walls which are orders of magnitude larger than the inherent microscopic pores of the "solid" wall fibers. Such membranes find utility in both gaseous and liquid phase separations. Fibers used in these membranes have a microporous structure with a dense permselective layer on the inside or outside surface. It is the porosity of the fiber walls which allows transport of chemical species between the fluid internal to the fiber and the fluid which surrounds the fiber. The fibers are packed into bundles and potted into tubes to form a membrane module.

Multilayer capillary membrane

Another type of capillary membrane is disclosed in U.S. Pat. No. 4,381,985 to Ryder. This membrane is formed from multiple layers of relatively soft polymer film, with each layer having embossed or etched channels on the surface thereof. Interspersed between these embossed layers are either layers of porous non-woven spun bonded material or smooth-surfaced film. This collection of interleaved layers is held together under compression to form a membrane assembly having capillary channels which traverse the membrane from one face to the other. In an electrodialysis cell, this membrane was able to achieve a reduction in hexavalent chromium concentration of five orders of magnitude in a 48 hour period. Such unexpectedly high ion transport efficiency is effected in two ways. First, the channels are made large enough in diameter to admit the desired ionic species, but small enough in diameter to disfavor transport of solvation complexes. Secondly, the imposition of channelized flow inherently limits ion diffusion in the undesired cross-axial directions. This membrane allows extremely high end concentrations of ionic species to be obtained and by virtue of its construction from inert materials can be used with very corrosive solutions. Heretofore, the benefits afforded by such capillary geometry for electrodialysis applications have gone unrecognized. With recognition of such advantages, the presently disclosed invention provides new forms of capillary membranes which are more versatile and easier to produce than the invention to Ryder. The device patented by Ryder really uses slabs of porous material (i.e., the woven layers) to form a two-dimensional layer region through which the ions can migrate. The unexpected filtering results of the patent to Ryder are herein improved upon by using actual tubular (one-dimensional) channels rather than slabs (two-dimensional) of meandering and interconnected channels. This reduces the counterproductive effect of diffusion by limiting the number of directions in which ions can diffuse. Specific embodiments of this invention offer improved means for adjusting permeability and use of the membrane in an automatically-controlled electrodialysis cell.

SUMMARY OF THE INVENTION

The present invention is an extension of concepts disclosed in Disclosure Document No. 345,300 previously filed in the Patent and Trademark Office. The main object of the present invention is to provide an MTM (Mass Transfer Membrane) for electrodialysis cells. The primary function of an MTM in an electrodialysis cell is to provide a separator or interface between the anolyte or catholyte and the fluid from which ions are to be extracted. This interface acts as an ion pump by virtue of its ability to maintain a substantial voltage drop across the interface. The MTM of the present invention is constructed so as to limit the motion of ions in directions other than the desired transport direction thereby increasing the mass transport efficiency.

More specifically, the present invention is directed to a channelized MTM which has improved ion separation characteristics when employed in electrodialysis cells. The chief embodiments of the MTM exploit either the formation of capillary voids in solid material or the use of hollow fibers to form capillary channels.

A first embodiment of the MTM is a solid, chemically-resistant form having capillary voids of diameter appropriate to achieve ion permselectivity. The capillaries which communicate between the front and back face of the MTM form provide ion transport paths. An elastic version of the form provides the ability to compress the MTM in a direction perpendicular to the longitudinal axes of the capillaries. Such compression alters the cross-sectional geometry of the capillaries resulting in a change in the permeability of the MTM. An alternative version of this embodiment incorporates a microporous material to fill the capillary voids.

Another embodiment of the present invention achieves an array of capillary channels by using a bundle of homogeneous hollow fibers potted together and faced off to provide a unidirectionally-porous block. The potted fibers have ends open at opposing faces of such a block. The permeability of the MTM can be controlled by design in one of two ways. The first is simple selection of the fiber inner diameter and the second is the use of a porous material to fill the inside of the fiber. Dynamic control of MTM permeability is achievable in either of two versions which alter the cross-sectional geometry of the fibers. The first makes use of elastic potting materials which can be deformed under compression thereby causing a either a flattening of the contained capillaries or a diminution of their cross-sectional area. The second version uses fibers which are not potted, but contained in a chamber which is pressurized in order to compress the fibers.

In a final embodiment of the present invention, the MTM comprises a bundle of porous-walled hollow fibers. Either a closed-loop bundle or an open-end bundle of porous hollow fibers is retained in a fixture which separates diluate and concentrate compartments of an electrodialysis cell. The assembly is placed between the anode and cathode of the electrodialysis cell with the axes of the individual fibers largely parallel to the desired direction of ion flow. Ions in the diluate electromigrate into the core of the hollow fibers and continue to flow within the fibers from the diluate compartment to the concentrate compartment.

The objectives of permselective, channelized flow addressed by Ryder's invention are achieved with greater efficiency in the present invention by a simpler geometry which is much easier to manufacture. Further, an embodiment with dynamically adjustable ion permeability is disclosed.

"Capillary voids" are continuous, linear, tubular-shaped open spaces within a material.

"Homogeneous hollow fibers" refers to hollow fibers having solid, non-porous walls.

"Porous hollow fibers" refers to hollow fibers manufactured to have porous walls.

"Permselective" refers to the characteristic of a membrane or membrane material to exhibit selectivity with respect to the chemical species which can permeate the membrane.

"Open fibers" refers to hollow fibers which are not filled with porous material.

"Filled hollow fibers" refers to hollow fibers which have been filled with permeable material.

"Microporous material" refers to solid material having interconnected porosity and average pore sizes which are small in comparison with the diameter of capillaries in which the material is to be placed.

OBJECTS AND ADVANTAGES

Several objects and advantages of the present invention are:

(a) to provide an MTM having improved control of ion diffusion by constraining diffusion to occur largely along one axis;

(b) to provide an MTM with increased mass transport efficiency;

(c) to provide an MTM with improved cooling;

(d) to provide an MTM with significantly increased capillary volume;

(e) to provide a high mass transport efficiency MTM which is relatively easy to manufacture;

(f) to provide an MTM with dynamically-controllable permeability to ion transfer;

(g) to provide an MTM with can be used for feedback control of ion concentration;

(h) to provide an MTM with improved ion pumping action;

(i) to provide an MTM capable of higher voltage drop and hence capable of supporting a greater internal electric field strength for the purpose of electromigration of ions;

BRIEF DESCRIPTION OF DRAWING

FIG. 1b is a pictorial diagram of the process for manufacturing the membrane of FIG. 1a.

FIG. 8b is a pictorial diagram of the MTM of FIG. 8a.

DETAILED DESCRIPTION OF THE INVENTION

The present invention is concerned with providing a permselective membrane assembly which exploits the permselectivity of capillary channels for ion separation applications. The associated membrane is disclosed in three chief embodiments. The first main embodiment is a slab of material having capillary voids which communicate between opposing faces of the slab. The second main embodiment is that formed by a fixtured collection of small caliber, solid-walled (impermeable-walled) hollow fibers. This embodiment is different from hollow fiber filters for blood dialysis in that the fibers of the present invention have impermeable walls and must be used in the presence of an ambient electric field with the field lines oriented parallel to the longitudinal axes of the hollow fibers. Ions flow along the hollow fiber interior rather than across the walls of the fiber. It is the inside diameter of the hollow fiber which establishes the permselectivity of the membrane. A final embodiment employs porous-walled hollow fibers which allow an electric field to bring ions into the interior of the fibers through the fiber walls.

It is the inside diameter of the hollow fiber which establishes the permeability of the membrane. A final embodiment employs porous-walled hollow fibers which allow local electric field gradients to bring ions into the interior of the fibers through the fiber walls. Once admitted to the interior of the fiber, the ambient electric field supports further electromigration transport of the ions parallel to the fiber longitudinal axis, along its interior. This final embodiment makes use of porous-walled hollow fibers, but for the purpose of initial introduction of ions into the hollow fiber interior. It remains, that in all embodiments of the membrane the primary filtering function is achieved by electromigration of ions along the length of the fiber against hydraulic resistance.

Slab Embodiment

Figure 1A:
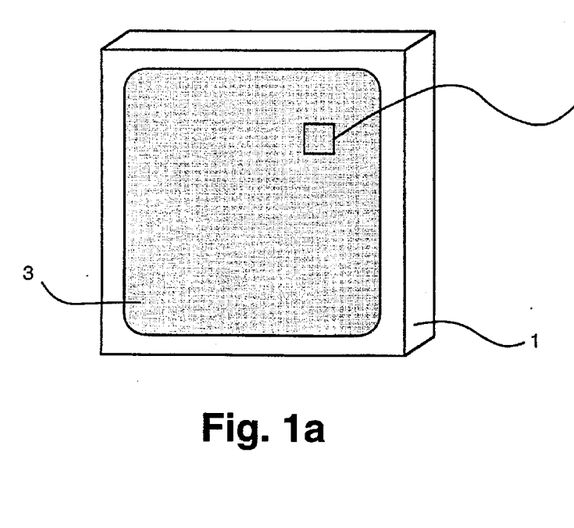
FIG. 1a is a pictorial diagram of the capillary membrane having tubular voids in a solid material.
Figure 1B:
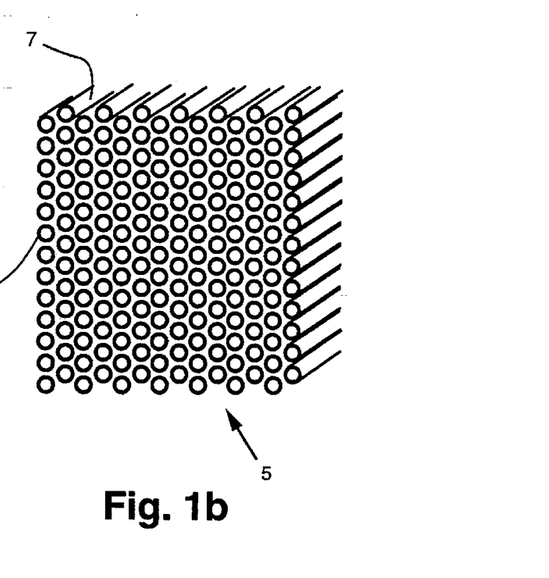

The first embodiment, the slab form, is depicted in FIG. 1a. The solid form 1 contains largely parallel capillary voids 7 shown in FIG. 1 b depicting a magnified region 5 of the membrane. For aqueous applications, the diameter of the capillaries must be large enough to admit the transport of desired ions, but small enough to restrict the transport of solvation complexes these ions may form. This embodiment can be constructed in one of two main ways; by either using removable fiber mandrels from a potting material or by permanently potting hollow fibers.

Figure 1C:
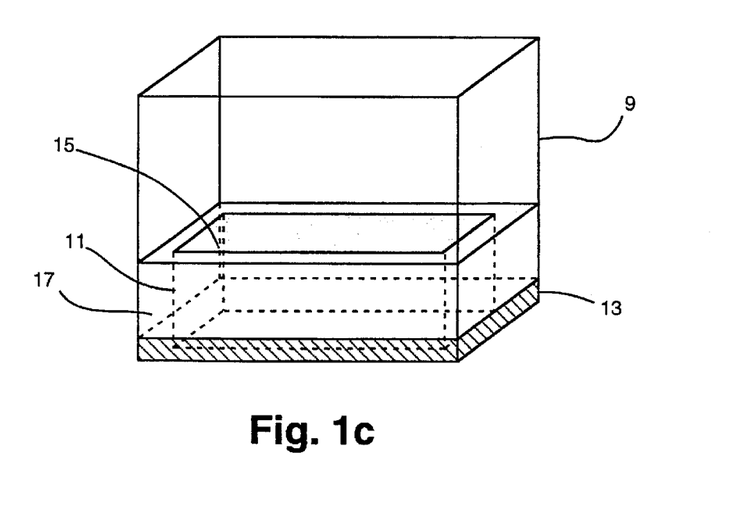

In the first method of constructing the slab embodiment, substantially the entire length of solid or hollow leachable fibers of appropriate diameter are potted as depicted in FIG. 1c. A container 9 contains a largely parallel array of fibers 11 with their longitudinal axes oriented vertically and immersed in potting material. One end of the fibers is first potted in a temporary potting material 13 which will be later removed to expose the open fiber ends. Consequently, only a very shallow depth of temporary potting material is required so that after its removal correspondingly short lengths of fiber will be exposed on the membrane face. After curing of the temporary potting material 13, the remaining bulk of the fibers can be immersed to a depth just short of with the remaining unencapsulated fiber ends 15 in a permanent potting material 17. In this way the unencapsulated fiber ends 15 form one face of the membrane. Subsequent to curing of the permanent potting material, the other face of the membrane can be formed by solvent or heat removal of the temporary potting material 13, thereby exposing the other ends of the fibers. Finally, the fiber material can be removed by immersion of the potted assembly in a leaching or solvent agent. In a variation of the first method for constructing the slab embodiment, the entire length of a hollow fiber bundle is potted in a permanent potting material. Upon cure, opposing ends of the potted assembly are trimmed by such means as described in U.S. Pat. No. 4,271,740 to Yamazaki, et al., "Cutting Apparatus for Potting Material with Hollow Fibers Embedded Therein" to form the membrane faces. Again, the fiber material is subsequently leached from the potting material. In either method of membrane manufacture, the lateral separation of the individual fibers prior to potting is required otherwise single capillary channels will not result. Means to achieve this are well known in the manufacture of kidney dialysis filters.

Chemically-resistant potting materials include polymers such as polyethylene and polyester, and resins such as the Dow Chemical Durakane series. Additionally, whole new classes of polymers having tailored properties are available to the present invention through use of metallocene catalysts. These catalysts which are transition metals sandwiched between cyclopentadiene rings allow molecular weight and comonomer distributions to be closely controlled in the polymerization process. In fact, monomers and comonomers once thought incompatible can be combined to form polymers with new properties[1]. The specific polymer properties of interest to the present application include resistance to strongly oxidizing acids, curing and polymerization temperatures, and elasticity among others.

Use of a potting material which is elastic permits alteration of the cross-sectional geometry of the capillary voids 7 with an attending variation in the permeability of the membrane. The leachable fibers can be composed of such materials as glass, low density polymer formulations, cellulose-based compounds, and many others.

The ability to remove heat from the capillary MTM allows it to operate at higher current and voltage without self-destruction. Because elevation of electrolyte temperature within the capillaries causes an increase in ohmic conductivity, heat dissipation within the capillaries can lead to thermal runaway unless either the current is limited external to the MTM or the heat is conducted away. Unchecked heat can melt the materials from which the MTM is constructed, and the resulting flow of hot oxidizing anions, characteristic of many industrial solutions, accelerates corrosion of MTM components. Consequently, cooling will extend the life of the MTM. A further benefit of cooling is the ability to maintain a constant temperature in the MTM and thereby avoid voltage drop fluctuations across the MTM due to thermal fluctuations. Such cooling of capillary membranes has not been addressed by the prior art.

Figure 2A:
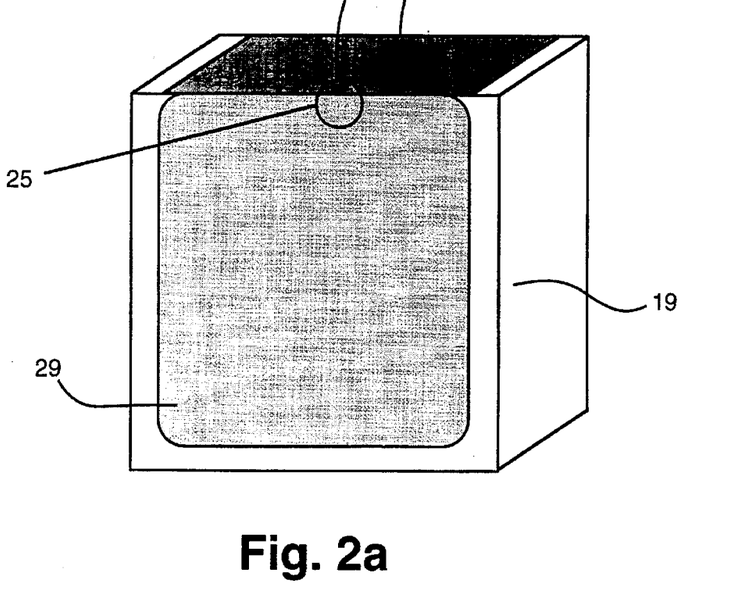
FIG. 2 is a pictorial diagram of the capillary membrane having tubular voids in a solid material for ion transfer and an additional set of tubular voids useful as cooling passages.
Figure 2B:
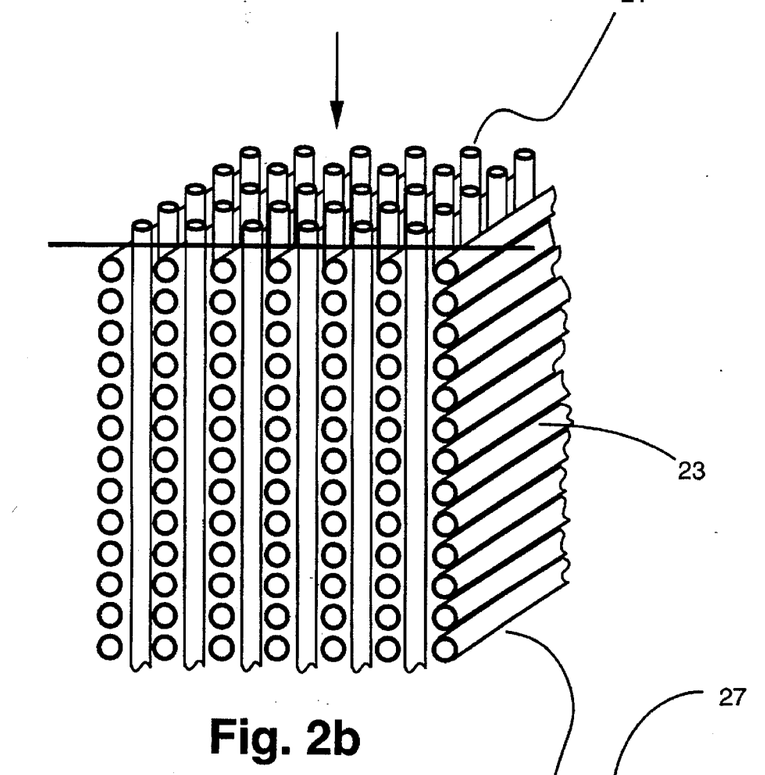

FIG. 2 depicts a modification of the membrane of FIG. 1 which includes provision for cooling. A magnified view of an edge region 25 of the solid form 19 shown in FIG. is 2a is given in FIG. 2b. Two sets 21 and 23 of capillary voids are depicted. There is no communication between the two sets of capillary voids. The set of capillary voids 23 communicates between the front and back faces of the form 19 and serves as the set of passages which transport ions. The set of capillary voids 21 is shown oriented largely perpendicular to the set of capillary voids 23 and communicates between the upper and lower face of the solid 19. The capillary voids 21 are cooling passages which traverse the volume of the solid 19 that exists between the capillary voids 23. The orientation of the two sets of capillary voids may assume many different relative positions and is not limited to that shown in FIG. 2b. It is required only that the capillary geometry allow the introduction and withdrawal of ionic solution and coolant fluids, respectively, without cross-contamination. This is most easily done in this embodiment with ion separation and membrane cooling functions operating across perpendicular faces 27 and 29 of the membrane as depicted in FIG. 2a.

FIG. 3 shows another variation on the embodiment of FIG. 1.

Figure 3A:
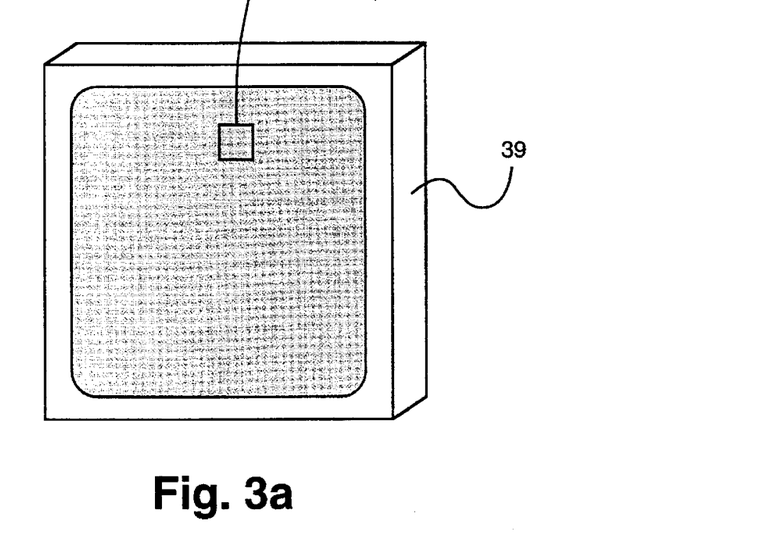
FIG. 3 is a pictorial diagram of the capillary membrane having tubular voids filled with a microporous material.
Figures 3B, 3C:
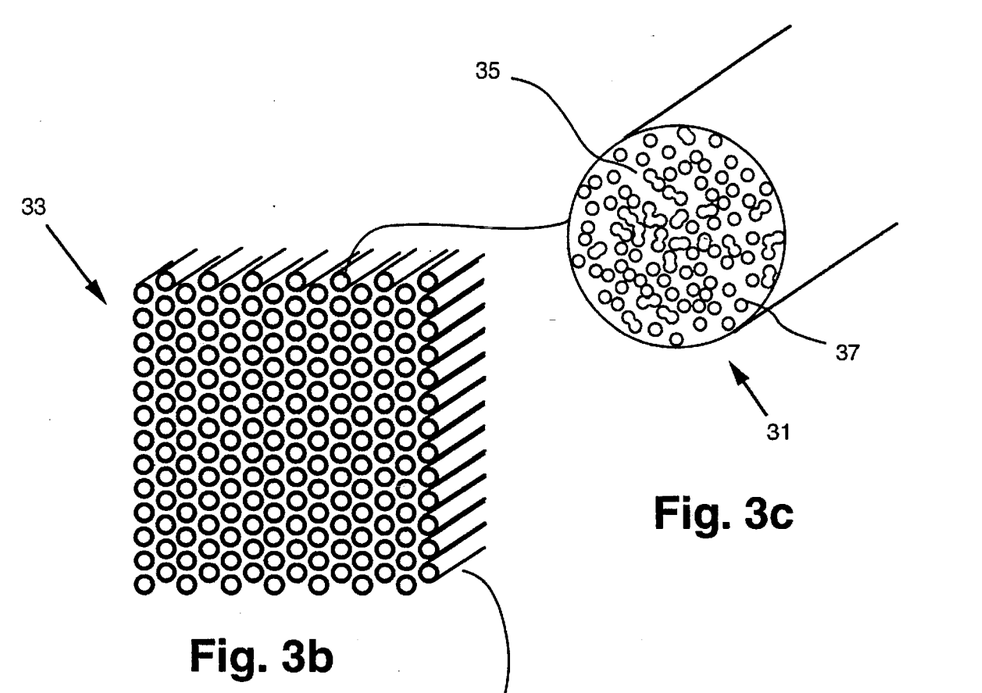

FIG. 3a depicts a solid membrane form 39. FIG. 3b shows capillary voids 31 within the magnified region 33 of the membrane assembly. FIG. 3c shows a modification to the membrane which is the inclusion of microporous material 35 within the capillary voids so that a second level of porosity is depicted by the microvoids 37 within the capillary. A modification is to infiltrate the length of the capillary voids with a microporous material 35 so that a second level of porosity is depicted by the microvoids 37 within the capillary. Depending upon the application, this microporous material can infiltrate just a longitudinal portion or the entire extent of the capillary void. Such a structure can offer the permselectivity of a conventional microporous filter, while at the same time limiting the diffusion of chemical species in other than the desired direction of transport. This is especially important in electrodialysis where electromigration must compete with diffusion to achieve concentration of ions.

The porous material can be formed within capillaries by such means as solvent evaporation of polymer solution, polymer precipitation, or infiltration of the tubes with a slurry of polymer spheres or particles in a volatile carrier liquid. The porosity can be controlled by evaporation rates, precipitation rates or infiltrating particle sizes, respectively. A preferred approach involves the use of foaming agents that can be used to create interconnected porosity of controlled mean pore size in the polymer filling material used to impregnate the capillary voids. The Axiomatics Corporation of Woburn, Mass. produces "Microcellular Foam" which is open celled, i.e. having interconnected porosity. This technology can provide filaments of such foam for potting in the present application. Average cell sizes in the foam can be as small as 0.5 microns, with a range of cell densities between $10^9$ and $10^{15}$ per cubic centimeter.

The second method for constructing the slab embodiment creates capillary channels using permanent hollow fibers as illustrated in FIG. 4. FIG. 4a is a pictorial diagram of the slab embodiment of the hollow fiber membrane 45. FIG. 4b depicts a magnified region of the membrane 43 comprising potted homogeneous hollow fibers 41. The potting material 47 fully surrounds and seals the outer surface of the hollow fibers 41 so that transport of chemical species is allowed only through the hollow core of the fibers from one face of the membrane to the other. This version of the slab membrane is manufactured by the same means outlined for the slab membrane of FIG. 1, but does not require the step of leaching or solvent removal of the fiber material.

Figure 4A:
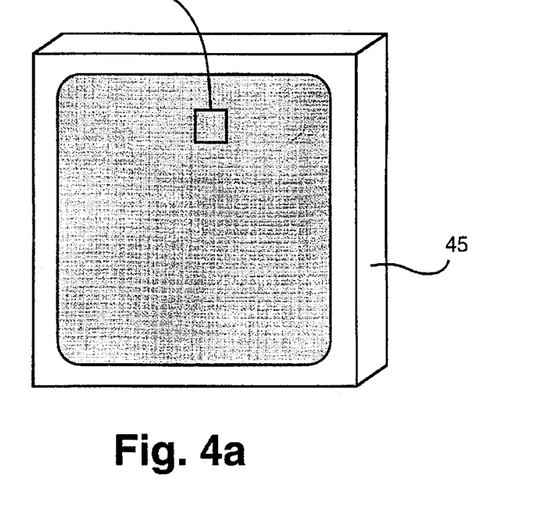
FIG. 4a is a pictorial diagram of the capillary membrane comprising and array of pored hollow fibers.
Figure 4B:
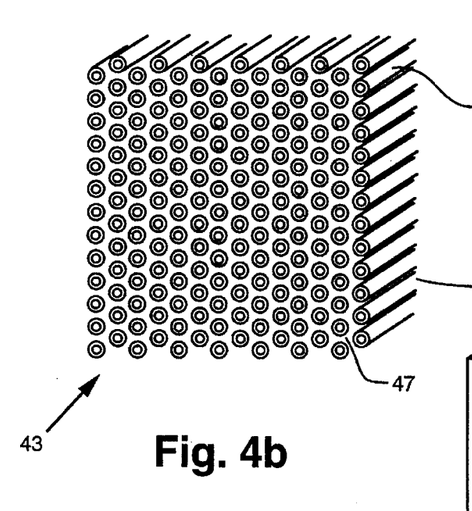
FIG. 4b is a pictorial diagram of a hollow fiber capillary filled with microporous material.
Figure 4C:
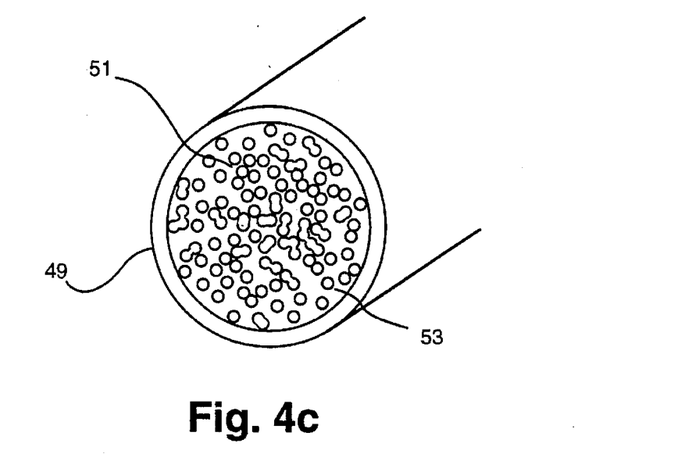
FIG. 4c is a pictorial diagram of a cooled, hollow fiber membrane.
Figure 4D:
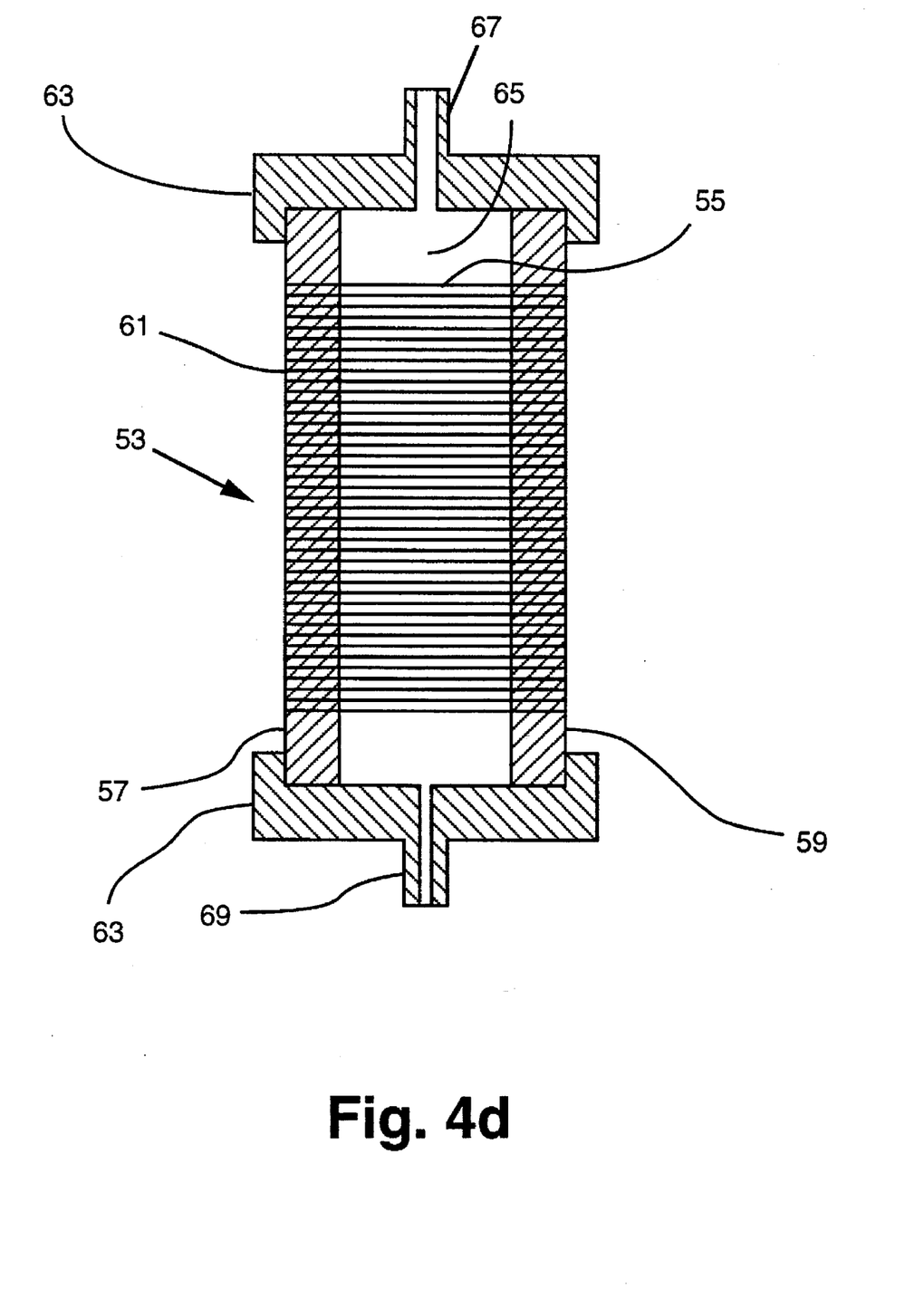

In FIG. 4c, the hollow fiber 49 is shown filled with microporous material 51 having interconnected porosity 53 as another option for this embodiment offering greater permselectivity. Analogous to semipermeable fiber dialysis cells which have the opposing ends of a fiber bundle potted in resin, the entirety of the fiber bundle of the present invention can be potted in epoxy or polymer resin. Prior to impregnation of the fibers with microporous material, the potted bundle can be sliced perpendicular to the axis of the fibers to form membranes of desired thickness. This eases the impregnation requirements by reducing the impregnation volume and pressure drop along the length of the fibers.

For applications such as electrodialysis of chromium plating rinsewater, Ryder teaches the use a capillary diameter of about a thousandth of an inch in diameter (approximately 250 microns) for efficient concentration of anions under the influence of an electric field. Such capillary diameters are readily achieved in the present invention with the use of commercially available hollow polymer fibers. The optimum inner diameter of the fibers will be established for specific applications and conditions. For example, higher end concentrations of anions in electrodialysis applications will favor the use of channels having higher hydraulic resistance. Additionally, fibers made from hydrophilic versus hydrophobic materials will exhibit differing hydraulic characteristics given the same inner diameters.

The benefit of increased hydraulic resistance in electrodialysis membranes has not previously been recognized. Prior art membranes used in electrodialysis have been designed to minimize the voltage drop across the membrane when in operation within an electrodialysis cell. The motivation for this has been to limit the Joulian heating of the membrane and such attending problems as membrane destruction and deleterious ionic diffusion. As the hydraulic resistance of the membrane is increased, the ion concentration in the membrane is reduced causing an increase in membrane electrical resistance. In an electrodialysis cell which maintains a constant cell current, a higher membrane electrical resistance means a larger voltage drop across the membrane. This implies a greater electric field strength within the membrane. In cases where the membrane must act against extremely high concentration gradients, this would be advantageous in increasing electromigration of ions within the membrane. In order to realize this benefit however, means of membrane cooling must of course be provided. The inventors of the presently disclosed MTM exploit the benefits of increase hydraulic membrane resistance in two versions of the solid-walled, hollow fiber MTM. The first comprises a fixed hydraulic resistance MTM which is cooled. The second is an MTM offer hydraulic resistance pability of adaptive hydraulic resistance.

Fixtured Solid-Walled Hollowed Fiber Embodiment

The second main embodiment of the present capillary membrane invention is an assembly of solid-walled hollow fibers fixtured at opposing ends of the fibers. Both cooled and pressurized versions of this embodiment are useful. A cooled, fixed geometry version of this embodiment of the MTM is depicted in FIG. 4c showing a cross-sectional diagram of membrane assembly 53. The open end portions of the hollow fibers 55 are sealed in potting partitions 57 and 59 which serve as the membrane front and back faces, respectively. The open fiber ends 61 emerge at the outer surfaces of partitions 57 and 59 so that the core of the fibers communicate between these outer surfaces. A housing 63 seals the partitions 57 and 59 to form a cooling chamber 65 through which the hollow fibers 55 are distributed. A cooling fluid is introduced and withdrawn through inlet 67 and outlet 69, respectively. Variation in the coolant flow rate can be used for dynamic control of the MTM temperature.

Figure 5:
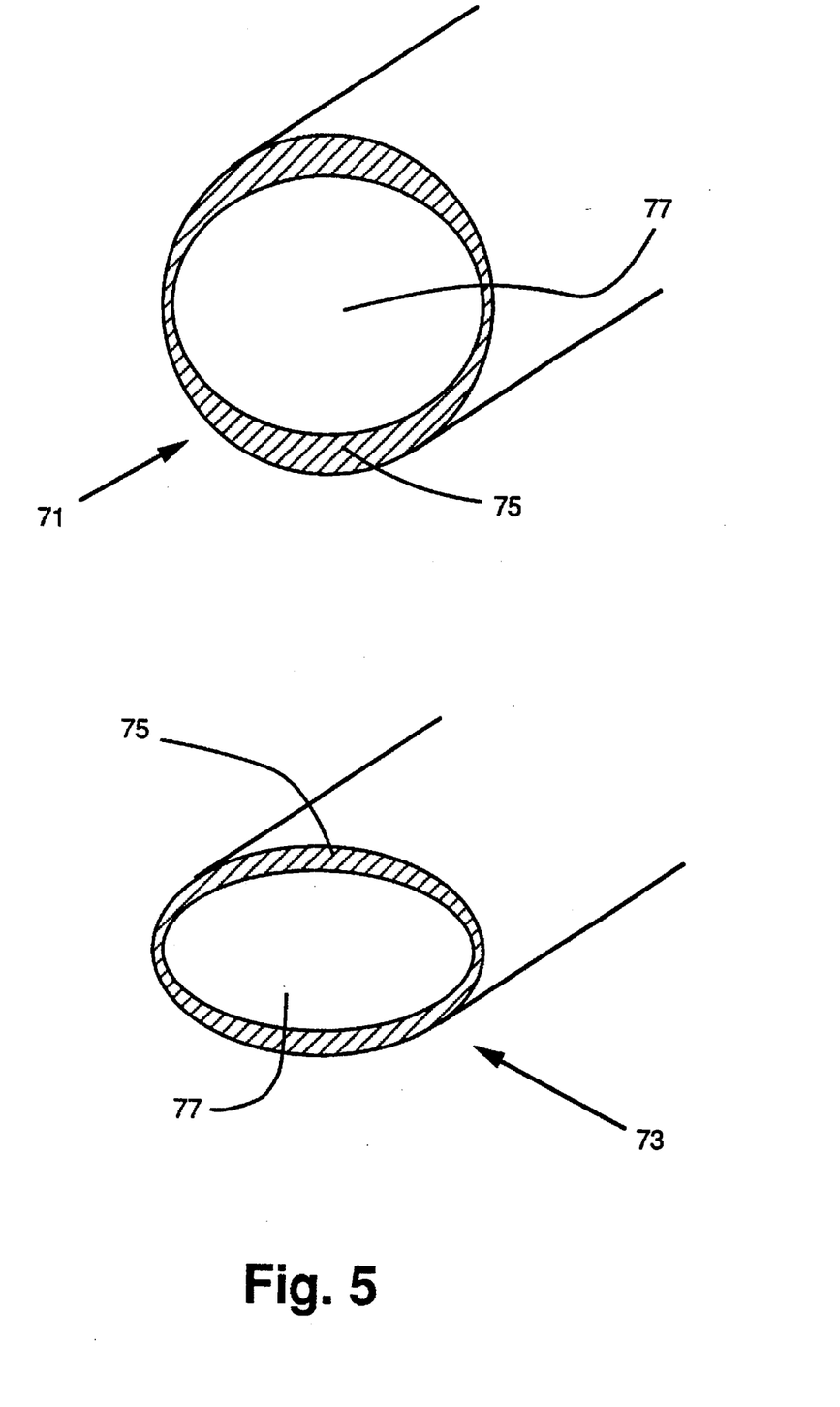
FIG. 5 is a pictorial diagram of collapsible homogeneous hollow fibers used in a membrane having pressure-adjustable permeability.

Freestanding non-potted hollow fibers can be made so that they compress preferentially along an axis which is perpendicular to the flow direction of the chemical species. This is the basis for an adaptive version of the present hollow fiber membrane. FIG. 5 shows the cross-sections 71 and 73 of a candidate hollow fiber prior and subsequent to deformation, respectively. The fiber is formed with a localized thinning of the fiber wall 75 so that when a sufficient differential pressure is applied across wall 75 the fiber and the inner core area 77 assume a collapsed geometry. All manner of hollow fiber cross-sections are taught by the prior art of hollow fiber manufacture so that such a geometry is readily manufacturable. Further, cross-sectional fiber geometries other than that shown are useful in achieving the collapsible feature.

A flattening of the hollow fiber cross-section causes an increase in the permselectivity of the membrane. The disclosed pressurizing mechanism will also serve to maintain the hydraulic resistance and associated permselectivity as the membrane ages (the membrane expands with thermal cycling and potentially erodes with electric current). Further, the MTM permselectivity can be maintained at the higher temperatures associated with a higher current operating regime. This mechanism facilitates remote, and feedback-controlled, in-situ retensioning of the membrane in contrast to the invention of Ryder. Ryder's invention requires removal of the membrane from the electrodialysis cell for tightening of multiple tie rods as the weep rate of the membrane is monitored.

Figure 6A:
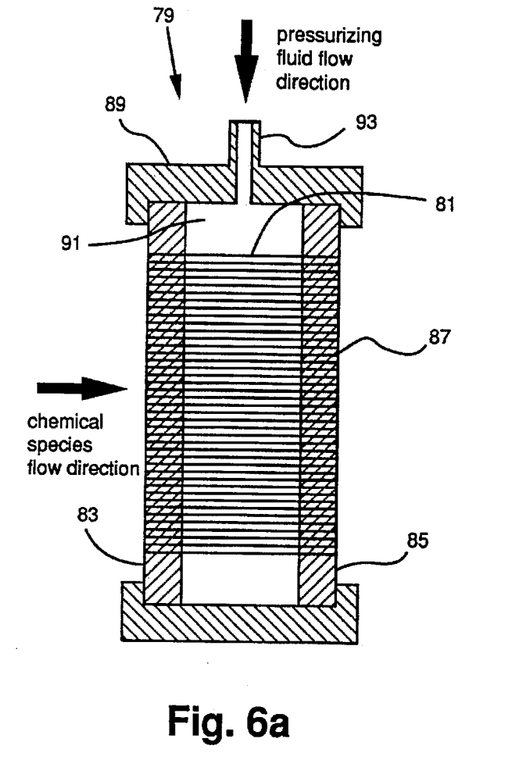
FIG. 6a is a cross-sectional diagram of an adjustable permeability membrane using compressible homogeneous hollow fibers.
Figure 6B:
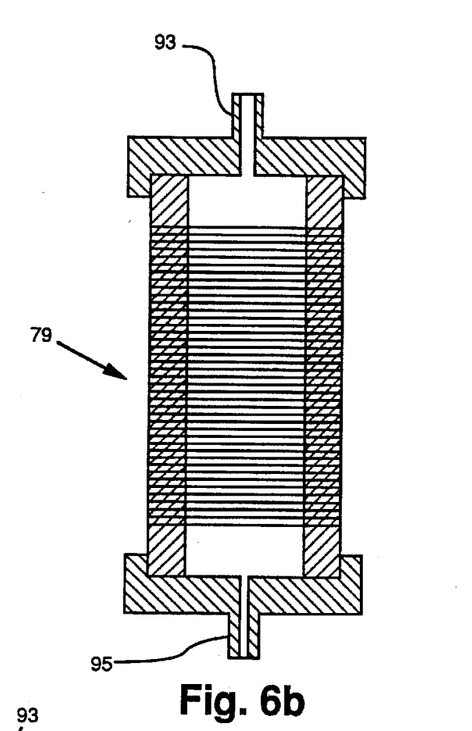
FIG. 6b is a cross-sectional diagram of an adjustable permeability membrane using compressible homogeneous hollow fibers and the pressurizing fluid as a heat exchange medium.
Figure 6C:
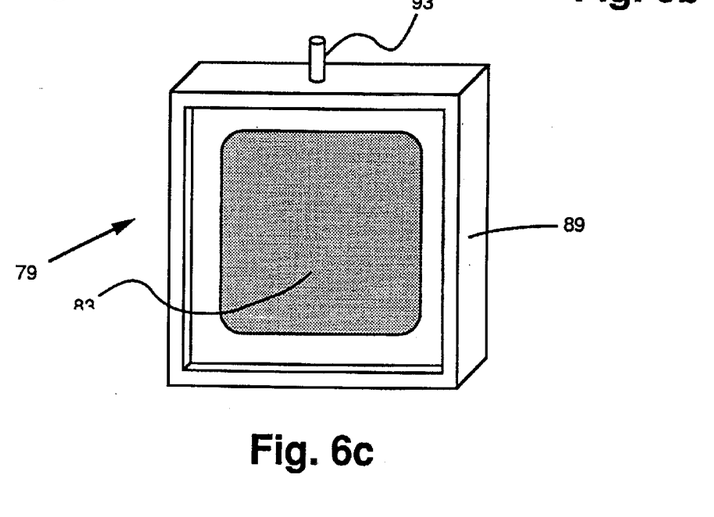
FIG. 6c is a pictorial diagram of an adjustable permeability membrane using compressible homogeneous hollow fibers.

FIG. 6a is a cross-sectional diagram of a membrane assembly 79 using the collapsible hollow fibers of FIG. 5. End portions of the hollow fibers 81 are sealed in potting partitions 83 and 85 which serve as the membrane front and back faces, respectively. The open fiber ends 87 emerge at the outer surfaces of partitions 83 and 85. A housing 89 seals the partitions 83 and 85 to form a pressurizing chamber 91 through which the hollow fibers 81 are distributed. A pressurizing fluid is introduced through inlet 93 in order to alter the hollow fiber cross-sections and thereby control the permeability of the membrane to chemical species transported through the hollow core of the fibers from one membrane face to the other. The inclusion of a pressurizing fluid outlet port 95 as depicted in FIG. 6b allows the pressurizing fluid to also be used for heat exchange purposes. FIG. 6c is a pictorial diagram of the membrane assembly 79 depicting the inlet port 93, outer surface partition 83, and housing 89. A multitude of form factor variations for the membrane are anticipated, including cylindrical. Inasmuch as the hollow fibers are constructed of elastomeric materials, compressed fibers will tend to relax to their original uncompressed state in relatively short periods of time once external pressure is reduced. This process can be accelerated with temperature increase (as achieved by reduced cooling or increased cell electric current), or by pressurizing the interior of the fibers. In most industrial applications the time associated with passive relaxation of the compressed fibers will be short enough. The salient feature is the ability to achieve a highly permselective membrane quickly.

Figure 7:
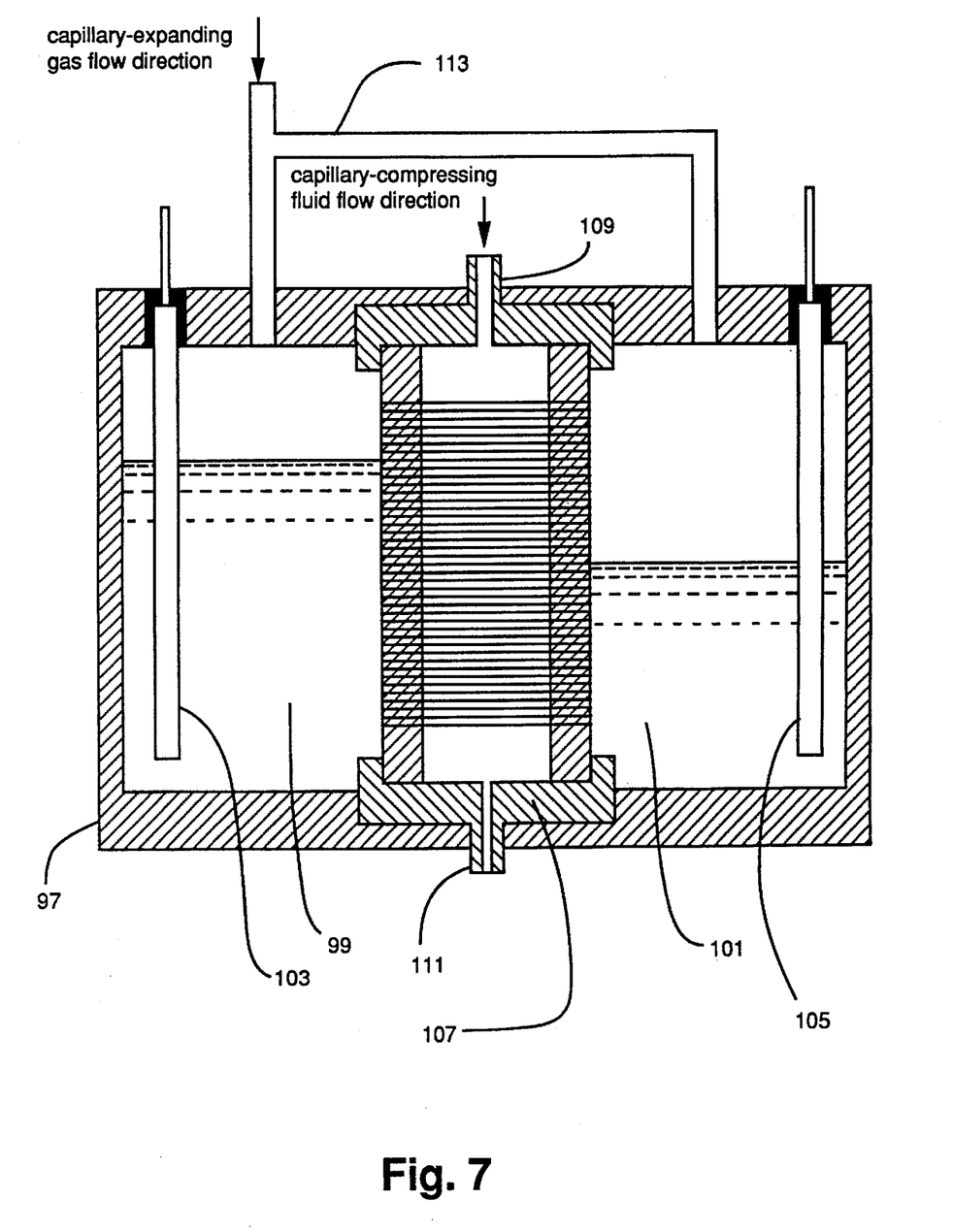
FIG. 7 is a cross-sectional diagram of an electrodialysis cell using an adjustable permeability membrane with compressible hollow fibers and with means for pressurizing both the interior and exterior of the hollow fibers.

FIG. 7 depicts the use of the MTM of FIG. 6b in an electrodialysis cell which allows positive pressurization of the interior of the MTM hollow fibers. A pressure tight housing 97 encloses the diluate compartment 99, the MTM 107, and the concentrate compartment 101. Electrodes 103 and 105 establish the flow of electric current through the MTM 107. Pressure for compressing the fibers of the MTM 107 is produced by introduction of a pressurizing fluid into inlet 109 of the MTM. As before, an outlet 111 is included for withdrawal of the pressurizing fluid. Fluid communication means 113 allows the introduction of a pressurizing gas for the purpose of providing a pressure source which counteracts the pressure tending to collapse the fibers of the MTM due to the fluid introduced through inlet 109. By making use of these two competing pressure sources, the cross-section of the MTM fibers can be dynamically controlled. Small caliber hollow fibers can easily withstand excess interior pressures above 1000 pounds per square inch hence, sufficient pressure dynamic range is available to decompress the fibers.

Porous-Walled, Hollow Fiber Embodiment

Figure 8A:
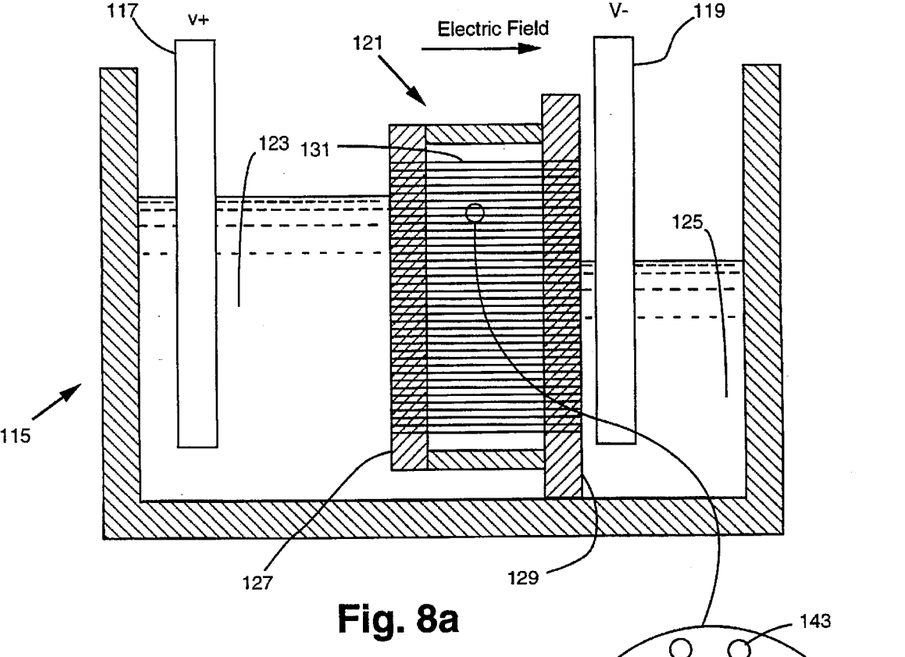
FIG. 8a is a cross-sectional diagram of an MTM using open-ended, porous-walled, hollow fibers.
Figure 8B:
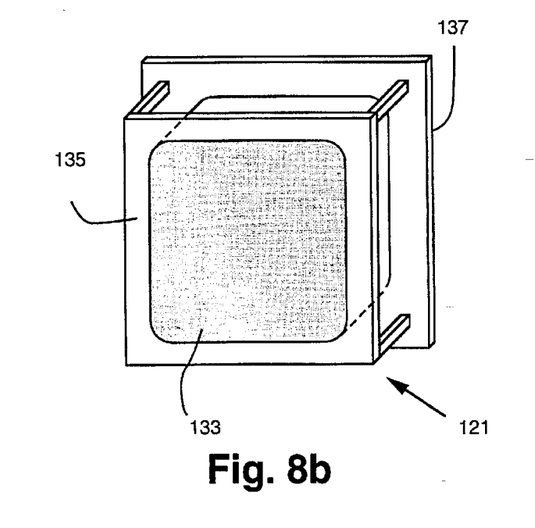
Figure 8C:
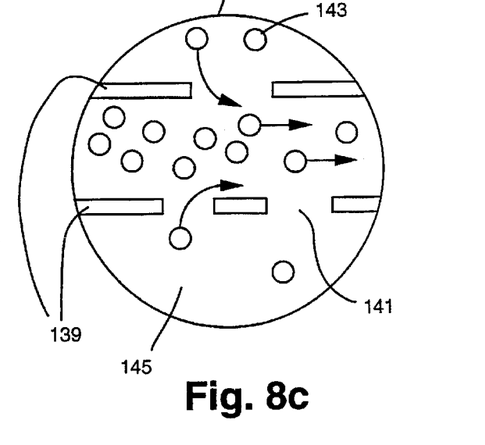
FIG. 8c is a magnified cross-sectional view of a single fiber within the MTM.

A final embodiment of the MTM which makes use of porous-walled hollow fibers is depicted in FIG. 8. An electrodialysis cell 115 is shown in FIG. 8a containing electrodes 117 and 119, and a porous hollow fiber MTM 121, which separates diluate compartment 123 from concentrate compartment 125. The front and back faces 127 and 129, respectively, of the MTM 121 are shown functioning as retainers of the bundle of open-ended fibers 131. A convenient way of forming such end faces is to use a potting material to encapsulate each end of the fiber bundle. FIG. 8b is a perspective view of the MTM showing the encapsulated ends of the fibers 133 on the front face 135. The larger sized back face 137 serves as the partition between diluate and concentrate compartments of the electrodialysis cell. Diluate solution is free to be convected throughout the unpotted regions of the fiber bundle. The fibers of the bundle are not tightly packed in order to promote such convection. The electric field established by the electrodes of the cell in FIG. 8a causes ions to electromigrate into the open ends of the fibers at end face 133. As the ion concentration within the core of the fibers increases, the conductivity of the fiber core increases and serves to project the electric potential of electrode 117 into the diluate compartment 123. Note that the collection electrode 119 is in close proximity to the back face 129 of the MTM in order to minimize the voltage drop between the surface of electrode 119 and the back face 129 of the MTM. FIG. 8c is a magnified view of a portion of a single porous hollow fiber and its immediate surround. The wall of the fiber 139 is perforated by the openings 141 which constitute the porosity of the fiber. As ions 143 concentrate within the fiber, the local electric field is in a direction which further encourages ions 143 from the diluate solution 145 to enter the fiber core through openings 141. The efficiency of such ion collection will depend on the applied cell voltage, the size and spacing of the pores in the fiber walls, the diameter and length of the fibers. Typically, porous-walled hollow fibers are made with pores as large as 10 microns in diameter. The admission of large solvation complexes into the fiber core may require significantly larger pore sizes. Means for achieving this objective of larger pore sizes are well known in the prior art. The present capillary MTM embodiment provides electrodialysis applications with the large membrane surface area common to conventional capillary dialysis used for kidney dialysis and industrial separations.

Figure 9:
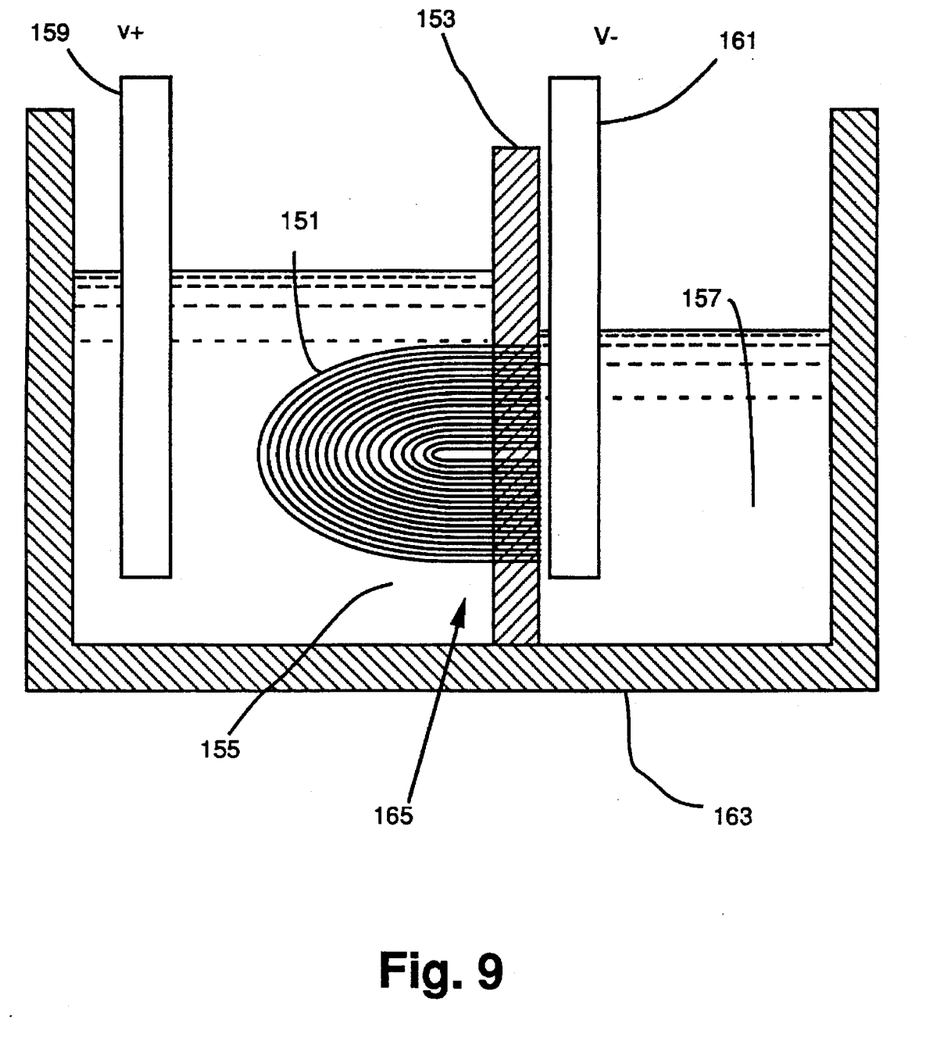
FIG. 9 is a cross-sectional diagram of an MTM using a loop bundle of porous-walled, hollow fibers.

FIG. 9 is an alternate version of the MTM of FIG. 8a which uses a loop of bundled, porous-walled hollow fibers 151. The MTM 165 is shown placed within electrochemical cell container 163. The open ends of the fibers are retained in a potting faceplate 153 which also serves as a partition between the diluate and concentrate compartments, 155 and 157, respectively. Ions are caused to enter the porous fibers as previously described and to electromigrate under the influence of the electric field established by electrodes 159 and 161.

References

1. J. Chowdhury and S. Moore, "Polymers by Blueprint," *Chemical Engineering*, Vol. 100, No. 4, April 1993, McGraw-Hill, Inc.

We claim:

1. A membrane system for chemical and electrochemical processes, comprising a collection of capillary tubes contained in a membrane assembly, and an electric field producing means; said membrane assembly having homogeneous, solid front and back surfaces largely impermeable to ions, said capillary tubes communicating between said front and back faces of said membrane assembly, said capillary tubes having largely parallel longitudinal axes, said electric field producing means located external to said membrane assembly so as to provide an electric field largely parallel to said longitudinal axes of said capillary tubes, said capillary tubes permeable to flow of chemical species only in direction of longitudinal axis of each said capillary tube along interior of each said capillary tube thereby providing ion transport paths between said membrane assembly front and back faces under the influence of said electric field.

2. A membrane system as recited in claim 1, wherein said membrane assembly further comprises a volume of chemically-resistant material forming said front and back face, said capillary tubes comprising tubular voids which communicate between said front and back faces of said membrane assembly, with the permeability of said assembly dependent on the diameter of said capillary tubes.

3. A membrane system as recited in claim 2, further comprising channels which do not communicate with said capillary tubes, said ions, or source of said ions, traverse the volume of the membrane assembly between said capillary tubes, said channels serving as cooling passages for removal of heat from said membrane.

4. A membrane system as recited in claim 2, wherein said chemically-resistant material is elastic and can be made to deform under compression so as to render said capillary tubes increasingly flattened with increased compression, such alteration in capillary tube cross-section thereby establishing a variation in the ion permeability of said membrane.

5. A membrane system as recited in claim 1, wherein said membrane assembly further comprises a volume of chemically-resistant potting material forming front and back face, said capillary tubes comprising tubular voids which communicate between said front and back faces of said membrane assembly, the interior length of said capillary tubes substantially filled with microporous material, the permeability of said membrane assembly dependent on the inner diameter of said capillary tubes and the permeability of said microporous material.

6. A membrane assembly as recited in claim 1, wherein said membrane assembly further comprises a volume of chemically-resistant potting material in a shape which has a front and back face, said capillary tubes comprising hollow fibers which communicate between said front and back faces of said membrane assembly, said hollow fibers potted by said potting material such that the exterior surface of said hollow fibers is coated by said potting material along the length of said hollow fibers, the inner diameter of said hollow fibers establishing the permeability of said membrane assembly.

7. A membrane system as recited in claim 6, further comprising channels which do not communicate with said capillary tubes, said ions, or source of said ions, traverse the volume of said membrane assembly between said capillary tubes, said channels serving as cooling passages for removal of heat from said membrane assembly.

8. A membrane system as recited in claim 6, wherein the interior length of said hollow fibers is substantially filled with microporous material, the permeability of said membrane assembly dependent on the inner diameter of said hollow fibers and the permeability of said microporous material.

9. A membrane system for chemical and electrochemical processes which comprises:
(a) a container, (b) a bundle of a plurality of homogeneous hollow fibers axially extending through the container and forming a corresponding plurality of largely parallel ion transport paths via the hollow core of said fibers, (c) partitions within said container supporting either end of said homogeneous hollow fibers and isolating the open fiber ends of said homogeneous hollow fiber from the remaining exterior surface of said fibers, (d) a first fluid chamber defined by the outer surfaces of said homogeneous hollow fibers and the inner surface of said partitions, and the inner surface of said container enclosed by said partitions, (e) a first fluid inlet in fluid communication with said, first fluid chamber, (f) a first fluid outlet in fluid communication with said first fluid chamber, (g) a second fluid inlet in fluid communication with the interior space of said homogeneous hollow fibers, (h) a corresponding second fluid outlet in fluid communication with the interior space of said homogeneous hollow fibers, and (i) and electric field producing means comprising a plurality of electrodes placed within said container exterior to said first fluid chamber, with at least one of said electrode located in proximity to said second fluid inlet and at least one said electrode located in proximity to said second fluid outlet; said electric field producing means providing an electric field which permeates said bundle of homogeneous hollow fibers and is largely parallel to said ion transport paths provided by said bundle of said homogeneous hollow fibers, said ion transport conducted under the influence of said electric field from said second fluid inlet, through said homogeneous hollow fibers to said second fluid outlet, fluid introduced into said first fluid chamber by means of said first fluid inlet removable by means of said first fluid outlet to serve the purpose of removing heat from said homogeneous hollow fibers, said membrane system thereby allowing electromigration concentration of ionic species in the longitudinal direction of said homogeneous hollow fibers as said ionic species flow along the interior of said homogeneous hollow fibers under the influence of said electric field.

10. A membrane system for chemical and electrochemical processes which comprises:
a) a container, (b) a bundle of a plurality of homogeneous hollow fibers axially extending through the container and forming a corresponding plurality of largely parallel ion transport paths via the hollow core of said fibers, (c) partitions within said container supporting either end of said homogeneous hollow fibers and isolating the open fiber ends of said homogeneous hollow fibers from the remaining exterior surface of said fibers, (d) a first fluid chamber defined by the outer surfaces of said homogeneous hollow fibers and the inner surface of said partitions and the inner surface of said container enclosed by said partitions, (e) a first fluid inlet in fluid communication with said first fluid chamber, (f) a first fluid outlet in fluid communication with said first fluid chamber, (g) a second fluid inlet in fluid communication with the interior space of said homogeneous hollow fibers, (h) a corresponding second fluid outlet in fluid communication with the interior space of said homogeneous hollow fibers, and (i) electric field producing means comprising a plurality of electrodes placed within said container exterior to said first fluid chamber, with at least one said electrode located in proximity to said second fluid inlet and at least one said electrode located in proximity to said second fluid outlet; said electric field producing means providing an electric field which permeates said bundle of homogeneous hollow fibers and is largely parallel to said ion transport paths provided by said bundle of said homogeneous hollow fibers, ion transport conducted under the influence of said electric field from said second fluid inlet, through said homogeneous hollow fibers to said fluid outlet, said membrane system thereby allowing electromigration concentration of ionic species in the longitudinal direction of said homogeneous hollow fibers as said ionic species flow along the interior of said homogeneous hollow fibers under the influence of said electric field, said homogeneous hollow fibers compressible and capable of flattened cross-sectional geometry given an increase in pressure in said first fluid chamber, the introduction of a pressurizing fluid in said first fluid inlet causing pressurization of said first fluid chamber and a resulting flattening of said homogeneous hollow fibers, the permeability of said membrane assembly dependent on said homogeneous hollow fiber cross-sectional geometry and thereby controllable by the pressure of said first fluid chamber.

11. A membrane system as recited in claim 10, wherein a fluid outlet is included in fluid communication with said first fluid chamber so that a pressurizing fluid introduced into said first fluid chamber by means of said first fluid inlet can be removed by means of said additional fluid outlet to serve the additional purpose of heat removal from said membrane assembly.

12. A membrane system for chemical and electrochemical processes which comprises:

(a) a bundle of a plurality of open-ended, porous-walled hollow fibers arranged such that individual said porous-walled hollow fibers are largely parallel to one another forming a corresponding plurality of ion transport paths via the hollow core of said fibers, (b) a supporting fixture, said supporting fixture further comprising at least first and second connected partitions which retain opposing first and second ends of said bundle of fibers, said first partition serving to support said first end of said fiber bundle, said second partition fully sealing the periphery of the fiber ends at said second end of said fiber bundle and allowing transport of ions from one side of said second partition to the other side of said partition solely by means of the hollow core of said fibers which penetrate said partition, and (c) electric field producing means providing an electric field largely parallel to the longitudinal axes of said porous-walled hollow fibers, said porous-walled hollow fibers admitting ionic species to the interior of said porous-walled hollow fibers through the ends of said porous-walled hollow fibers at said first end of said fiber bundle and through pores in walls of said porous-walled hollow fibers along length of said porous-walled hollow fibers, said membrane assembly allowing electromigration concentration of ionic species in the longitudinal direction of said porous-walled hollow fibers as said ionic species flow along the interior of said porous-walled hollow fibers under the influence of said electric field.

13. A membrane system for chemical and electrochemical processes which comprises:

(a) a "U"-shaped bundle of a plurality of open-ended, porous-walled hollow fibers having said porous-walled hollow fibers which comprise the two "legs" of said "U"-shaped bundle largely parallel to one another forming a corresponding plurality of largely parallel ion transport paths via the hollow core of said fibers, (b) a supporting fixture, said supporting fixture further comprising at least one partition which retains both ends of said bundle of fibers allowing the open ends of said fibers to penetrate said partition, said partition fully sealing the circumferential edges of the fiber ends and allowing transport of ions from one side of said partition to the other side of said partition solely by means of the hollow core of said fibers which penetrate said partition, and (c) electric field producing means providing an electric field largely parallel to the longitudinal axes of the largely parallel portions of said porous-walled hollow fibers, said porous-walled hollow fibers admitting ionic species to the interior of said porous-walled hollow fibers through the ends of said porous-walled hollow fibers and through pores in walls of said porous-walled hollow fibers along length of said porous-walled hollow fibers, said membrane assembly allowing electromigration concentration of ionic species in the longitudinal direction of said porous-walled hollow fibers as said ionic species flow along the interior of said porous walled hollow fibers under the influence of said electric field.

14. A method of preparing a semipermeable membrane assembly comprising the steps of:

(a) packing together a collection of largely parallel hollow polymer fibers; (b) potting said collection of hollow fibers in a chemically-resistant potting material to form a potted assembly such that the entire length of each said fiber is fully coated with said chemically resistant potting material; (c) forming an assembly front and back face by cutting away a portion of said chemically-resistant potting material and portions of said hollow fibers from said potted assembly along two surfaces to form said assembly front and back face, said surfaces largely perpendicular to the orientation of said hollow fibers, said hollow fibers opened along said surfaces.

15. A method of preparing a semipermeable membrane assembly comprising the steps of:

(a) packing together a collection of largely parallel fibers of a type taken from either the category of solid or hollow fibers; (b) potting said collection of fibers in a chemically-resistant potting material to form a potted assembly such that the exterior surface of each said fiber along the entire length of each said fiber is fully coated with said chemically-resistant potting material; (c) forming a membrane assembly front and back face by cutting away a portion of said chemically-resistant potting material and portions of said fibers from said potted assembly along two surfaces to form said membrane assembly front and back face, said surfaces largely perpendicular to the orientation of said fibers; (d) leaching the material comprising said fibers from said potting material so as to form capillary voids within said potting material which communicate between said assembly front and back surfaces.

16. A method of preparing a semipermeable membrane assembly as recited in claim 15 including the additional step of substantially filling the length of said capillary voids with a microporous material.

* * * * *